United States Patent
Lee et al.

(10) Patent No.: US 9,264,911 B2
(45) Date of Patent: Feb. 16, 2016

(54) APPARATUS AND METHOD FOR CONTROLLING POWER BASED ON ENERGY EFFICIENCY IN MULTIPLE-INPUT AND MULTIPLE-OUTPUT (MIMO) COMMUNICATION SYSTEM

(71) Applicant: Samsung Electronics Co., Ltd., Suwon-si (KR)

(72) Inventors: Byung Moo Lee, Seoul (KR); Jong Ho Bang, Suwon-si (KR); Nam Jeong Lee, Suwon-si (KR); Jin Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 14/470,193

(22) Filed: Aug. 27, 2014

(65) Prior Publication Data
US 2015/0103953 A1 Apr. 16, 2015

(30) Foreign Application Priority Data
Oct. 11, 2013 (KR) .................. 10-2013-0121157

(51) Int. Cl.
*H04K 1/02* (2006.01)
*H04W 16/14* (2009.01)
*H04B 1/04* (2006.01)
*H04W 52/02* (2009.01)

(52) U.S. Cl.
CPC ............. *H04W 16/14* (2013.01); *H04B 1/0475* (2013.01); *H04W 52/0251* (2013.01); *H04W 52/0261* (2013.01); *H04B 2001/0416* (2013.01)

(58) Field of Classification Search
None
See application file for complete search history.

(56) References Cited

U.S. PATENT DOCUMENTS

| | | |
|---|---|---|
| 2007/0178839 A1 | 8/2007 | Rezvani et al. |
| 2011/0003609 A1 | 1/2011 | Sundstrom et al. |
| 2011/0249576 A1 | 10/2011 | Chrisikos et al. |
| 2011/0310987 A1 | 12/2011 | Lee et al. |
| 2012/0087397 A1 | 4/2012 | Sudo |
| 2013/0021960 A1 | 1/2013 | Lee et al. |
| 2013/0045744 A1* | 2/2013 | Dimpflmaier et al. ........ 455/437 |
| 2013/0324181 A1* | 12/2013 | Aio et al. ............... 455/522 |

FOREIGN PATENT DOCUMENTS

WO   WO 2013/137638 A1   9/2013

OTHER PUBLICATIONS

International Search Report issued Dec. 18, 2014 in counterpart PCT Application No. PCT/KR2014/008680 (3 pages, in English).

* cited by examiner

*Primary Examiner* — Adolf Dsouza
(74) *Attorney, Agent, or Firm* — NSIP Law

(57) ABSTRACT

Provided is an apparatus and method for managing a power consumption of a transmitter based on energy efficiency in a multiple-input and multiple-output (MIMO) communication system. The transmitter is configured to control a power of at least one of a baseband (BB) component, a radio frequency (RF) chain component, and a power amplifier (PA) component based on calculation of the energy efficiency.

22 Claims, 16 Drawing Sheets

APPARATUS AND METHOD FOR CONTROLLING POWER BASED ON ENERGY EFFICIENCY IN MULTIPLE-INPUT AND MULTIPLE-OUTPUT (MIMO) COMMUNICATION SYSTEM

CROSS-REFERENCE TO RELATED APPLICATION(S)

This application claims the benefit under 35 USC 119(a) of Korean Patent Application No. 10-2013-0121157, filed on Oct. 11, 2013, in the Korean Intellectual Property Office, the entire disclosure of which is incorporated herein by reference for all purposes.

BACKGROUND

1. Field

The following description relates to an apparatus and a corresponding method for controlling a power in a multiple-input and multiple-output (MIMO) communication system.

2. Description of Related Art

A communication system designed to maximize a transmission capacity may transmit signals using a maximum power of a power amplifier (PA).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a transmitter includes a baseband (BB) component, a radio frequency (RF) chain component, a power amplifier (PA) component, and a controller configured to control a power consumption of at least one of the BB component, the RF chain component, and the PA component based on a calculation of an energy efficiency (EE) of the transmitter.

The transmitter may be configured to calculate the EE using a unit of bits per second per watt (bps/W).

The transmitter may further include a calculator configured to calculate the EE based on a data rate and a power consumption of the transmitter.

The transmitter may further include a data rate estimator configured to estimate the data rate based on channel information between the transmitter and terminals associated with the transmitter.

The transmitter may further include a monitoring unit configured to monitor a power consumption of the BB component, a power consumption of the RF chain component, and a power consumption of the PA component, and a power consumption estimator configured to estimate the overall power consumption based on the monitored power consumptions.

The controller may be configured to control the power consumption of at least one of the BB component, the RF chain component, and the PA component so that total power consumption of the transmitter is less than or equal to an allowable power consumption.

The transmitter may further include a receiving unit configured to receive the allowable power consumption from a central management apparatus configured to manage a plurality of transmitters.

The transmitter may further include a transmitting unit configured to transmit a data rate and a power consumption of the transmitter to the central management apparatus.

The transmitter may further include a storage unit configured to store information on a performance of the transmitter based on a parameter, wherein the controller is configured to determine, based on the stored information, an operation point at which the EE is maximized, and the operation point corresponds to the power consumption of at least one of the BB component, the RF chain component, and the PA component.

The parameter may include at least one of a number of transmitting antennas included in the transmitter, a precoding scheme employed by the BB component, a resolution of the RF chain component, and a power reduction factor of the PA component.

The performance may include at least one of the EE, a data rate of the transmitter, and a power consumption of the transmitter.

The number of transmitting antennas included in the transmitter may be greater than a number of terminals, provided in at least a predetermined ratio, associated with the transmitter.

In another general aspect, a transmitter includes an obtainer configured to obtain a number of terminals associated with the transmitter, a determiner configured to determine whether a number of transmitting antennas included in the transmitter is greater than the number of the terminals provided according to at least a predetermined ratio, and a controller configured to control a power consumption of at least one of a baseband (BB) component, a radio frequency (RF) chain component, and a power amplifier (PA) component included in the transmitter based on a determination that the number of the transmitting antennas is greater than the number of the terminals provided according to at least the predetermined ratio.

The controller may be configured to reduce the power consumption of at least one of the BB component, the RF chain component, and the PA component to maximize an energy efficiency (EE) of the transmitter while providing identical bandwidths to the terminals.

The controller may be configured to reduce the power of at least one of the BB component, the RF chain component, and the PA component to maximize an EE of the transmitter while maintaining a data rate for communication with a previously assigned terminal.

The controller may be configured to reduce a radiation power of the transmitter according to a ratio between the number of the terminals and the number of the transmitting antennas.

In another general aspect, a method of controlling a power of a transmitter includes obtaining a target energy efficiency (EE) of the transmitter, and controlling at least one of a power of a baseband (BB) component, a power of a radio frequency (RF) chain component, and a power of a power amplifier (PA) component to cause an EE of the transmitter to reach the target EE.

A number of transmitting antennas included in the transmitter may be greater than a number of terminals, provided according to at least a predetermined ratio, associated with the transmitter.

The method may further include calculating a power consumption of the transmitter, calculating a data rate of the transmitter, and calculating the EE based on the power consumption and the data rate.

The calculating of the power consumption may include monitoring a power consumption of the BB component, monitoring a power consumption of the RF chain component, monitoring a power consumption of the PA component, and estimating the power consumption of the transmitter based on the monitored power consumptions.

In another general aspect, an energy efficiency (EE) calculator for calculating the EE of a transmitter includes a data rate estimator configured to estimate a data rate of the transmitter, a power consumption estimator configured to estimate a power consumption of the transmitter, and an EE calculator configured to calculate the EE based on the power consumption and the data rate.

The power consumption estimator may include a first monitoring unit configured to monitor a power consumption of a baseband (BB) component of the transmitter, a second monitoring unit configured to monitor a power consumption of the radio frequency (RF) chain component, a third monitoring unit configured to monitor a power consumption of the power amplifier (PA) component, and wherein the power consumption estimator is configured to estimate the power consumption of the transmitter based on the monitored power consumptions.

The EE calculator may be configured to calculate the EE using a unit of bits per second per watt (bps/W).

The data rate estimator may be configured to estimate the data rate based on channel information between the transmitter and terminals associated with the transmitter.

Other features and aspects will be apparent from the following detailed description, the drawings, and the claims.

Figure 1:
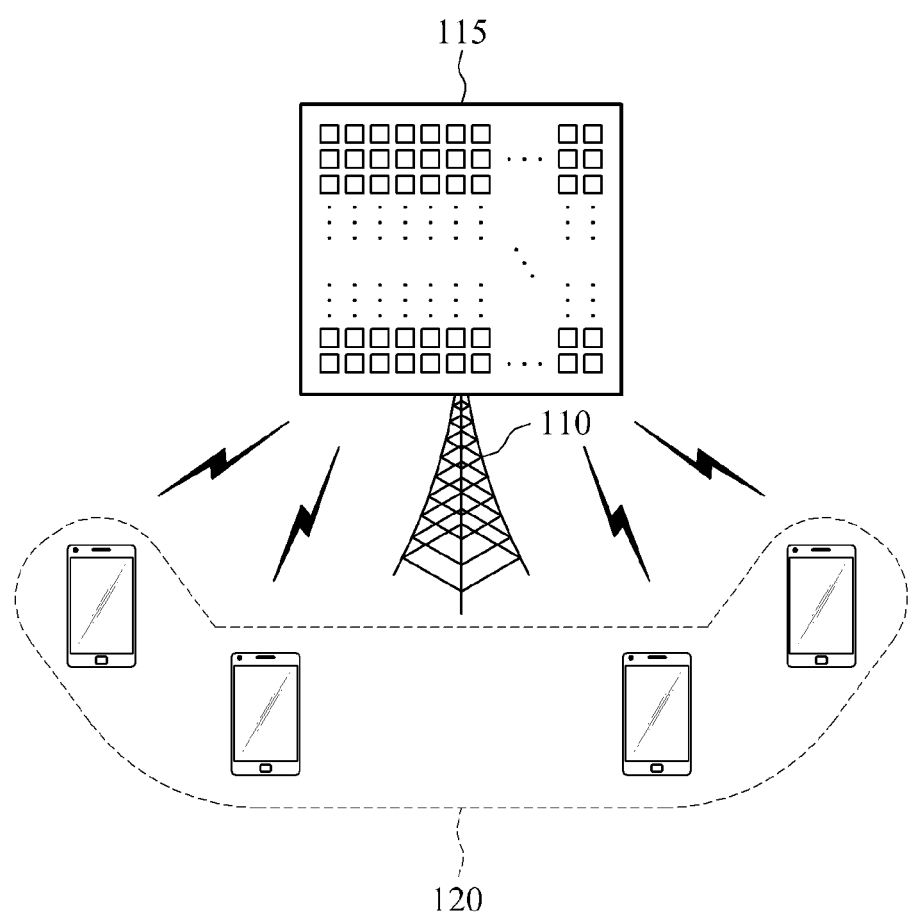
FIG. 1 is a diagram illustrating an example of a transmitter configured to increase an energy efficiency (EE).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a transmitter 110 configured to increase an energy efficiency (EE).

Referring to FIG. 1, the transmitter 110 includes an antenna unit 115. The antenna unit 115 includes transmitting antennas. In this example, a number of the transmitting antennas is greater than a number of terminals 120, and the number of the transmitted antennas is provided in at least a predetermined ratio to the number of terminals 120, receiving a service from the transmitter 110. The predetermined ratio may be, for example, a factor of ten. The number of the transmitting antennas is also greater than a number of data streams, provided in at least a predetermined ratio, to be transmitted simultaneously. The predetermined ratio is, for example, a factor of ten. The transmitter 110 refers to an apparatus that transmits radio signals. Such a transmitter 110 may be, for example, a base station, an access point (AP), or a mobile terminal.

In this example, the transmitter 110 increases the EE of the transmitter 110 by utilizing a multiple-input and multiple-output (MIMO) scheme that uses a plurality of transmitting antennas. For example, the transmitter 110 transmits radio signals to the terminals 120 in a multipath fading environment in which signals are transferred through a variety of paths.

In this example, the transmitter 110 transmits signals by concentrating energy on a desired area using a significantly greater number of transmitting antennas than the number of the terminals 120. As discussed above, an example of such a significantly greater number is the use of a ten-to-one ratio of transmitting antennas to the terminals 120. For example, when the transmitter 110 transmits radio signals to one of the terminals 120, the transmitter 110 concentrates energy at a position of the corresponding terminal. Thus, unnecessary energy consumption is reduced because an increased portion of the concentrated energy is available to the corresponding terminal, and hence it is possible for the terminal to recognize a signal with greater energy efficiency. The transmitter 110, in such an approach, provides an energy-efficient mobile communication service using a relatively small amount of power.

The antenna unit 115 is potentially provided in various structures. For example, the antenna unit 115 is provided a two-dimensional structure, or alternatively a three-dimensional structure. In some examples, the antenna unit 115 is provided in a structure in which the plurality of transmitting antennas is disposed in a two-dimensional array. The two-dimensional structure may be transformed in various shapes, such as a square shape, a rectangular shape, and a circular shape. The antenna unit 115 is also potentially provided in a three-dimensional structure, such as a three-dimensional structure in which two-dimensional arrays of the plurality of transmitting antennas are disposed 60 degrees (°) apart from each other. However, these are merely possible examples, and alternative two-dimension structures and three-dimensional structures are usable in other examples.

Figure 2:
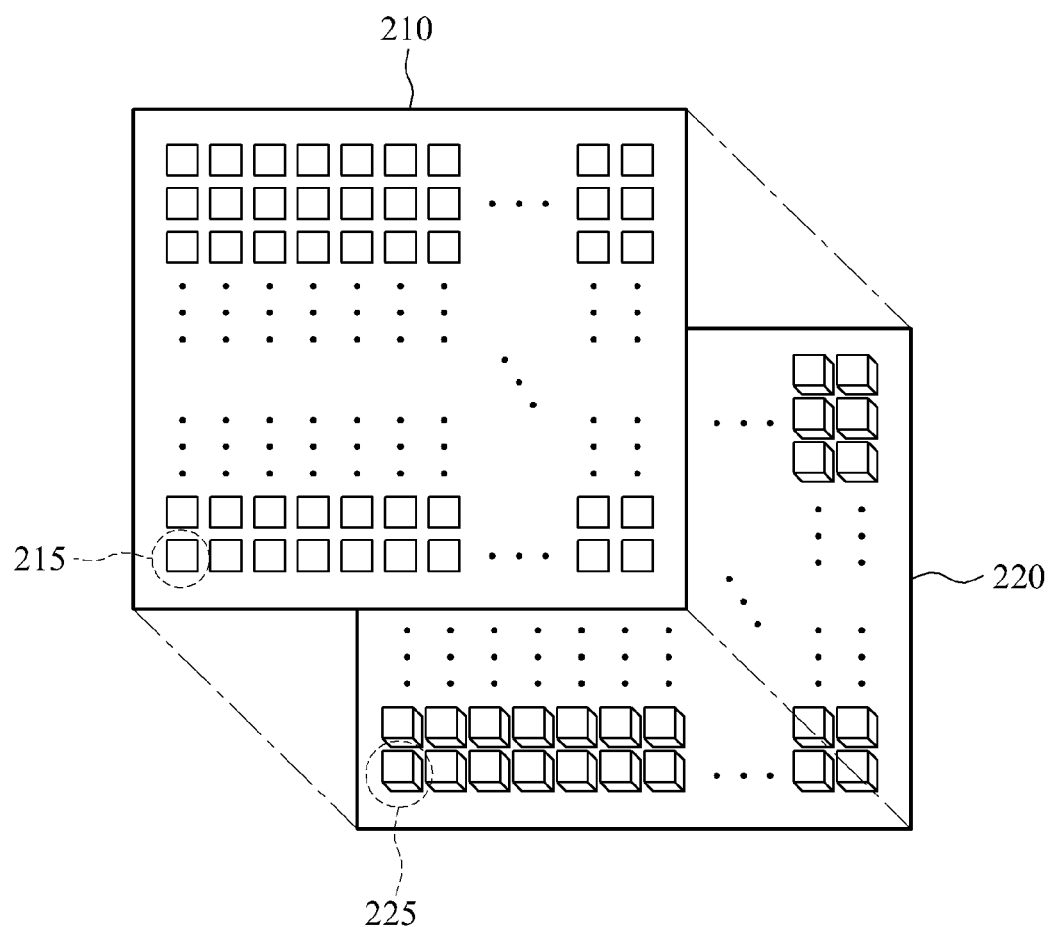
FIG. 2 is a diagram illustrating an example of a correlation between radio frequency (RF) chain components and antennas included in a transmitter.

FIG. 2 illustrates an example of a correlation between radio frequency (RF) chain components and antennas included in a transmitter.

Referring to FIG. 2, a transmitter includes an antenna unit 210 and an RF chain component unit 220. The antenna unit 210 includes a plurality of transmitting antennas, and the RF chain component unit 220 includes a plurality of RF chain components. For example, each RF chain component includes a digital-to-analog converter (DAC), a filter, and a power amplifier (PA).

Radio signals transmitted by the plurality of transmitting antennas included in the antenna unit 210 potentially have different characteristics. For example, an amplitude of a radio signal transmitted by a first transmitting antenna may differ from an amplitude of a radio signal transmitted by a second transmitting antenna. A phase of the radio signal transmitted by the first transmitting antenna may differ from a phase of the radio signal transmitted by the second transmitting antenna.

In FIG. 2, the plurality of transmitting antennas included in the antenna unit 210 correspond to the plurality of RF chain components included in the RF chain component unit 220. That is, there may be a mapping between the transmitting antennas and RF chain components. For example, a transmitting antenna 215 corresponds to an RF chain component 225. By establishing this relationship, the RF chain component 225 is designated to perform a pre-processing task for radio signals transmitted by the transmitting antenna 215 mapped to it.

In general, a power consumption of a PA component included in a transmitter occupies the largest portion of the power consumption of the transmitter. However, as described with reference to FIG. 1, when a number of transmitting antennas is considerably greater than a number of users, the transmitter concentrates energy, for example, on a desired area where the intended receiver is located. In this example, the transmitter concentrates radiation energy at a position of a user terminal to reduce an amount of radiation power used to transmit radio signals. When the amount of radiation power is reduced, a total power consumption used by PA components is reduced.

As the number of transmitting antennas included in the transmitter increases, the number of the RF chain components corresponding to the transmitting antennas increases due to the need to provide RF chain components corresponding to the additional transmitting antennas. When the number of the RF chain components increases, a total power consumption of the RF chain components increases due to the power requirements of the additional RF chain components. Thus, when the number of the transmitting antennas is considerably greater than the number of users, a difference between a proportion of a total power consumption of the PA components to the power consumption of the transmitter and a proportion of the total power consumption of the RF chain components to the power consumption of the transmitter decreases. When the number of the transmitting antennas is considerably greater than the number of users, controlling both power of the PA components and power of the RF chain components to control the power consumption of the transmitter becomes an effective way to manage power requirements.

The transmitter, in an example, provides technology that controls both a power of a PA component and a power of an RF chain component to maximize an EE. In such an example, the transmitter adjusts a resolution of the RF chain component to control the power of the RF chain component. The resolution of the RF chain component is related to a resolution of the DAC included in the RF chain component. A DAC that uses a low resolution may use a smaller amount of power, when compared to a DAC that converts a digital signal to an analog signal that uses a higher resolution. Conversely, the DAC that uses a high resolution may use a greater amount of power, when compared to a DAC that converts a digital signal to an analog signal using a low resolution. While other aspects of the DAC affect power usage, in general a DAC with higher resolution uses more power.

In this example, the transmitter also concurrently controls a power of a baseband (BB) component. For example, the transmitter controls a complexity of an algorithm used for precoding to control the power of the BB component. When the precoding is performed using a low complexity algorithm, the BB component uses a smaller amount of power in comparison to a case in which the precoding is performed using a high complexity algorithm. Conversely, when the precoding is performed using a high complexity algorithm, the BB component may use a greater amount of power in comparison to a case in which the precoding is performed using a low complexity algorithm. This relationship between the complexity of the precoding algorithm and the power consumption exists because the more complicated the precoding algorithm is, the more processing resources are consumed. As a result of consuming more processing resources, more power is consumed. A power control scheme is described further, below.

Figure 3:
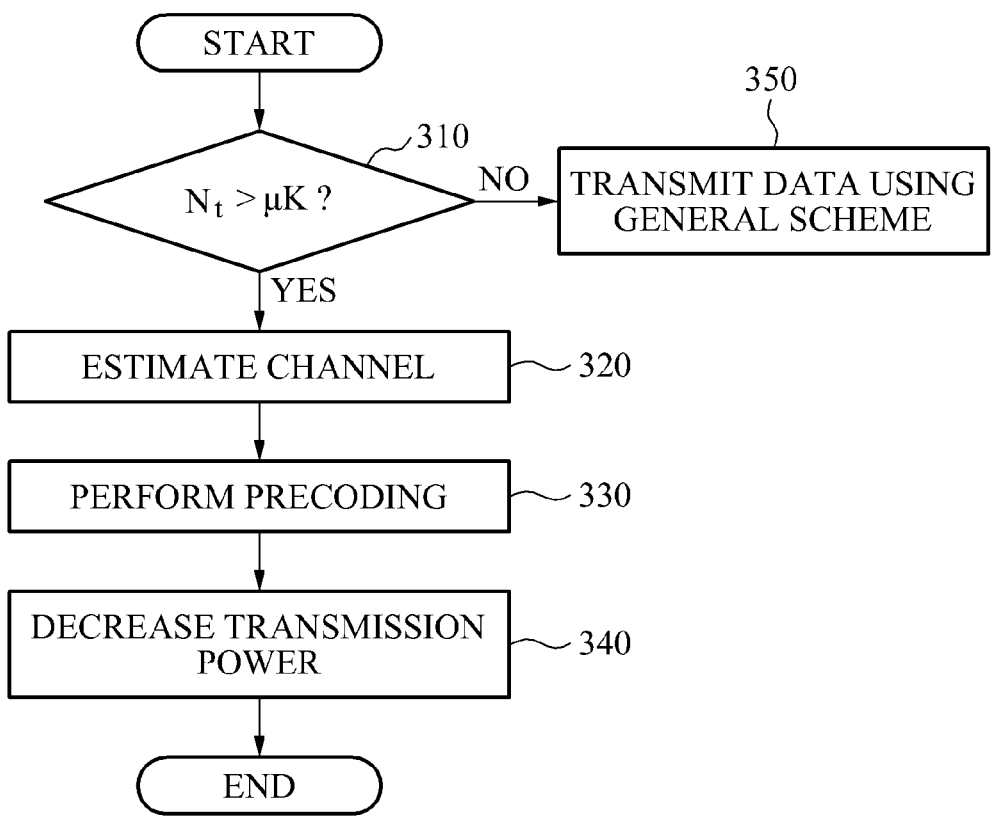
FIG. 3 is a flowchart illustrating an example of an operating method of a transmitter configured to increase an EE.

FIG. 3 illustrates an example of an operating method of a transmitter configured to increase an EE. A general explanation of how the transmitter increases an EE is described in advance of the operating method with reference to FIG. 3, as follows.

The transmitter models the EE associated with its operation. For example, the transmitter uses a model configured to calculate the EE. In such an example, the EE of the transmitter is modeled to be measured in a unit of bits per second per watt (bps/W). Here, a unit of bits per second (bps) is used to quantify a data rate, and a unit of watts (W) is used to quantify power consumption. Thus, bps indicates a relationship between a quantity of data transmitted with respect to time, and W indicates a relationship between a quantity of energy consumed with respect to time.

When the EE of the transmitter is modeled to be measured in the unit of bps/W, the transmitter increases the EE using a variety of methods, examples of which are listed in Table 1. These examples are based on changes that, when applied to the bps and W values, increase the overall value of bps/W, which is used as a measure of EE.

TABLE 1

1) Method of increasing bps and decreasing W
2) Method of maintaining W and increasing bps
3) Method of maintaining bps and decreasing W
4) Method of increasing both bps and W and increasing bps further
5) Method of decreasing both bps and W and decreasing W further Referring to FIG. 3, the method determines whether a scheme of increasing an EE is applicable, based on a number of transmitting antennas. For example, the transmitter determines whether a scheme of increasing an EE is applicable, based on a number of transmitting antennas. In 310, the method determines whether the number $N_t$ of the transmitting antennas is greater than a number K of users provided in at least a predetermined ratio $\mu$. For example, the transmitter determines whether the number $N_t$ of the transmitting antennas is greater than a number K of users provided in at least a predetermined ratio $\mu$. The predetermined ratio $\mu$ may be set to be a factor of ten, and also be variable. Hence, the factor of ten is an example, and other values are usable in other examples.

When it is determined that a sufficient number of transmitting antennas are included, when compared to the number of the users, in 320 the method estimates a channel. For example, the transmitter estimates a channel, in 320. In such an example, the transmitter estimates the channel through a feedback of channel information from the users, for example, a channel quality index (CQI). In 330, the method performs precoding based on the estimated channel. For example, the transmitter performs precoding based on the estimated channel.

In 340, the method decreases a transmission power to maximize the EE. For example, the transmitter decreases a transmission power to maximize the EE. For example, to maximize the EE, the transmitter uses at least one of the methods listed in Table 1. Thus, the transmitter reduces a radiation power by modifying a number of data streams to be transmitted simultaneously by a number of transmitting antennas. In an example, the number of the data streams to be transmitted simultaneously corresponds to a number of users receiving radio signals from the transmitter.

In response to it being determined that there are not a sufficient number of transmitting antennas included, in 310, when compared to the number of the users, in 350 the method transmits data using a general scheme. For example, the transmitter transmits data using a general scheme, in 350.

Figure 4:
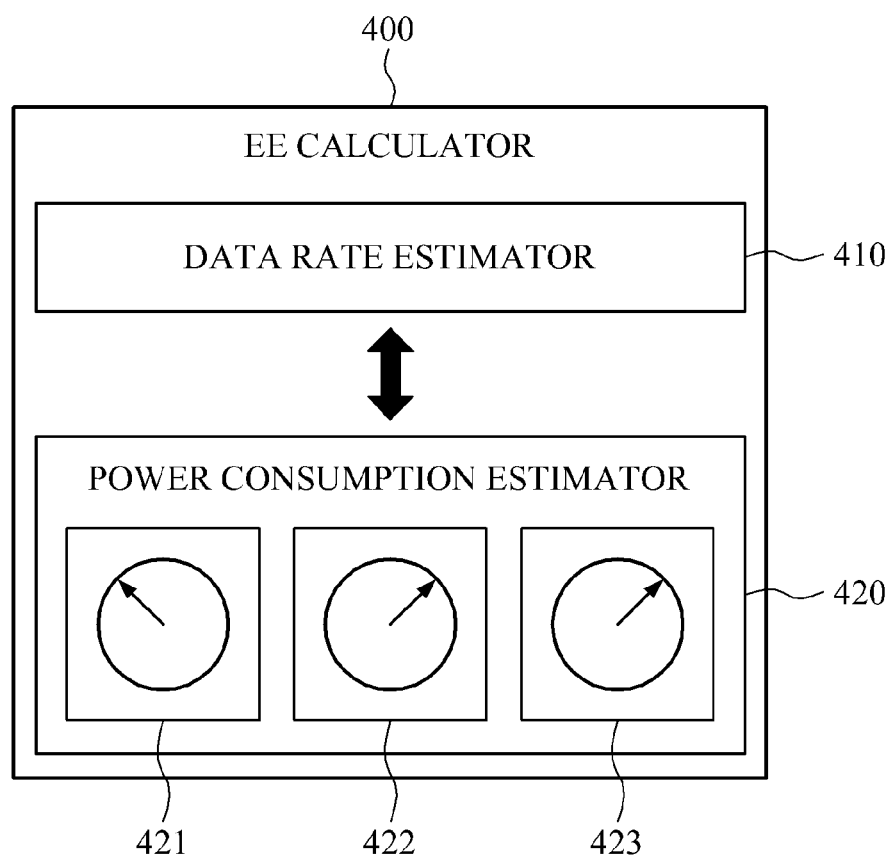
FIG. 4 is a block diagram illustrating an example of an EE calculator configured to calculate an EE.

FIG. 4 illustrates an example of an EE calculator 400 configured to calculate an EE.

Referring to FIG. 4, a transmitter uses the EE calculator 400 to determine a measure of the EE associated with the transmitter. As described above, an EE of the transmitter is expressed, for example, in a unit of bps/W. Accordingly, the EE calculator 400 includes a data rate estimator 410 and a power consumption estimator 420. By utilizing these devices, the EE calculator is able to determine values of bps and W that can be processed to ascertain EE values for the transmitter.

The data rate estimator 410 estimates a data rate of the transmitter. The estimated data rate is referred to as a spectral efficiency. The data rate estimator 410 estimates the data rate, for example, in a unit of bps based on channel information fed back from a reception terminal.

The power consumption estimator 420 estimates a power consumption of the transmitter. For example, the power consumption estimator 420 monitors a current power consumption of a transmission terminal for each component of the terminal. For example, the power consumption estimator 420 includes a first monitoring unit 421 configured to monitor a power consumption of a PA component of the terminal, a second monitoring unit 422 configured to monitor a power consumption of an RF chain component of the terminal, and a third monitoring unit 423 configured to monitor a power consumption of a BB component. In this example, the power consumption estimator 420 estimates a sum of the power consumptions of the respective components to be the power consumption of the transmission terminal.

Figure 5:
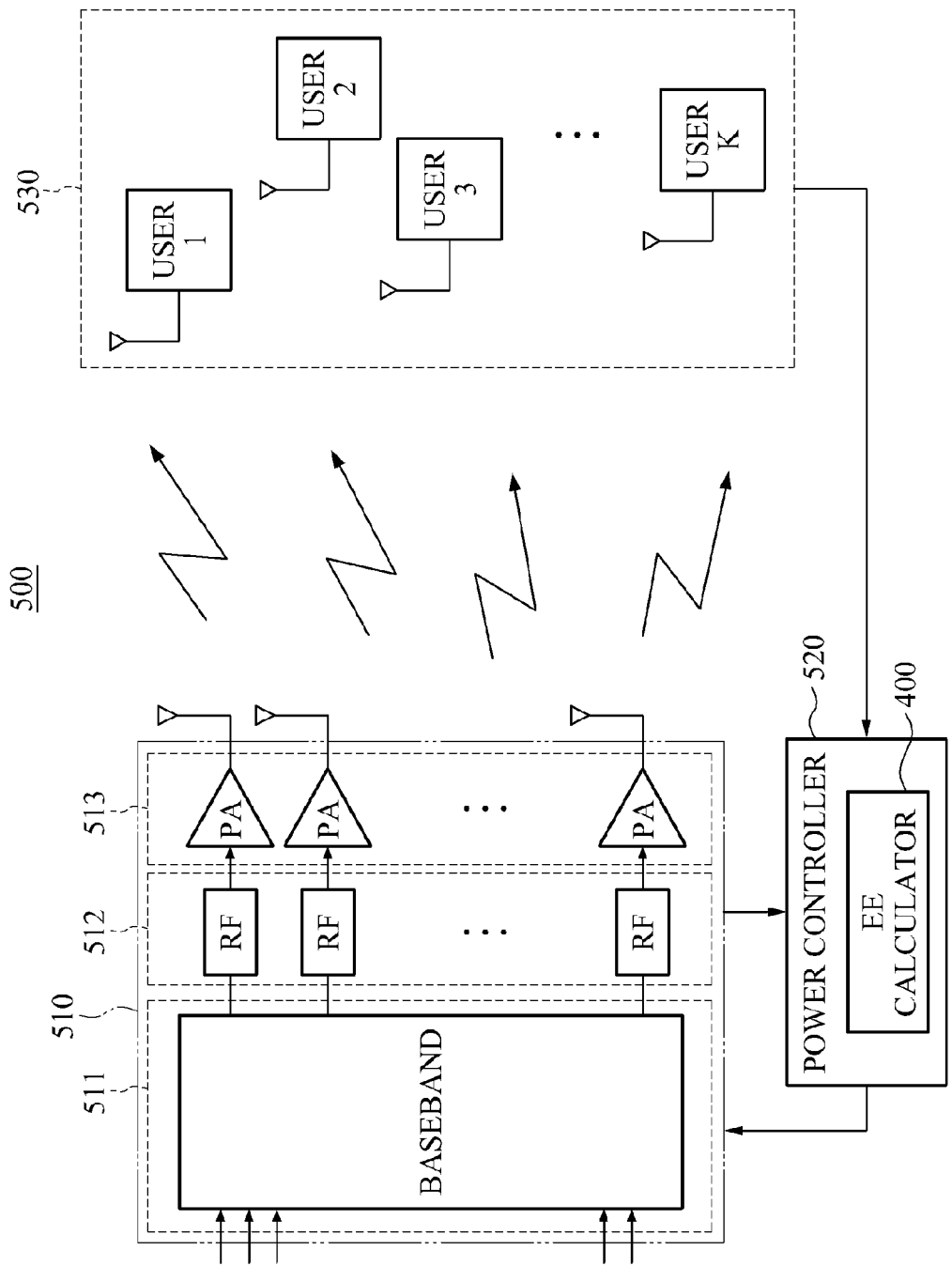
FIG. 5 is a diagram illustrating an example of a transmission system configured to increase an EE using a power controller.

FIG. 5 illustrates an example of a transmission system 500 configured to increase an EE for the transmission system 500 using a power controller.

Referring to FIG. 5, the transmission system 500 includes a transmitter 510 and reception terminals 530.

In the example of FIG. 5, the transmitter 510 includes a BB component 511, an RF chain component 512, and a PA component 513. A power controller 520 is configured to control a power of each component of the transmitter 510. The power controller 520 includes the EE calculator 400 described previously with reference to FIG. 4.

The transmitter 510 controls a power of each component included in the transmitter 510, using the EE calculator 400 to track power consumption. For example, the transmitter 510 obtains a current power consumption of each component, using the EE calculator 400. The transmitter 510 then control the power of each component based on the current power consumption of each component. For example, the transmitter 510 decreases the power of the PA component 513, increases the power of the RF chain component 512, and maintains the power of the BB component 511.

For example, the transmitter 510 controls the power of each component to maximize the EE of the transmitter 510. A scheme of controlling the power of each component to maximize the EE of the transmitter 510 is described further later.

Figure 6:
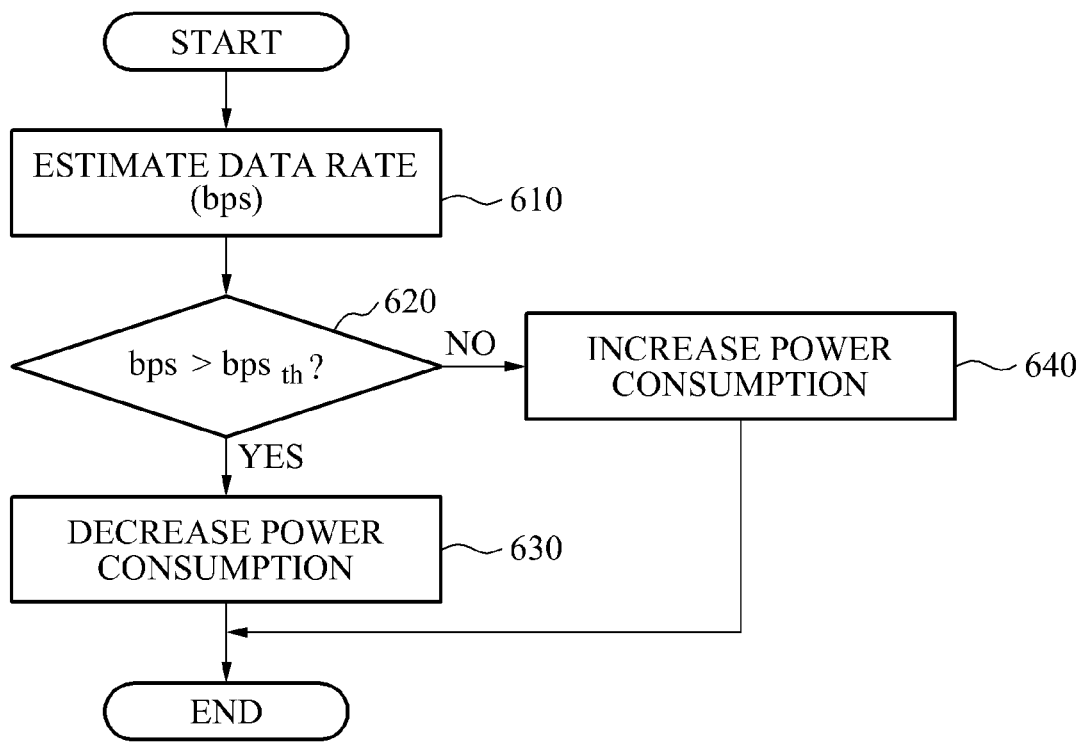
FIG. 6 is a flowchart illustrating an example of an operating method of a transmitter configured to increase an EE while satisfying a required data rate.

FIG. 6 illustrates an example of an operating method of a transmitter configured to increase an EE while satisfying a required data rate.

Referring to FIG. 6, the method compares the required data rate to a current data rate to determine whether a power consumption of the transmitter is to be increased or decreased. For example, the transmitter compares the required data rate to a current data rate to determine whether a power consumption of the transmitter is to be increased or decreased. In such an example, the transmitter controls the power consumption to maximize the EE of the transmitter while satisfying the required data rate.

In 610, the method estimates a current data rate in a unit of bps. For example, the transmitter estimates a current data rate in a unit of bps. In 620, the method compares the current data rate to a required data rate. For example, the transmitter compares the current data rate to a required data rate.

When the current data rate exceeds the required data rate, in 630, the method decreases a power consumption of the transmitter. For example, the transmitter decreases a power consumption of the transmitter, in 630. In such an example, the transmitter decreases the power consumption to maximize an EE of the transmitter while satisfying the required data rate. The transmitter increases the EE by decreasing the current data rate to the required data rate. For example, the transmitter may reduce a power consumption of a PA component by decreasing a radiation power. The transmitter reduces a power consumption of a BB component by employing a precoding scheme having a lower complexity, when compared to a precoding scheme currently in use. The transmitter reduces a power consumption of an RF chain component by decreasing a resolution of the RF chain component within a range that is allowed by communication specifications.

When the current data rate does not exceed the required data rate, in 640 the method increases the power consumption of the transmitter. For example, the transmitter increases the power consumption of the transmitter, in 640. The increase is performed because otherwise the transmitter does not transmit data quickly enough, and hence it increases power consumption to ensure that a sufficient data transmission rate is achieved. Thus, the transmitter increases the power consumption to maximize the EE of the transmitter while satisfying the required data rate. For example, the transmitter increases the current data rate to the required data rate. If the transmitter is to increase the data rate, the transmitter may increase a data rate by increasing the radiation power, by employing a precoding scheme having a higher complexity, in comparison to a precoding scheme currently in use, or by increasing the resolution of the RF chain component. As discussed previously, such changes improve the data transmission rate, but increase power consumption. Hence, in this example, the transmitter selects an option maximizing the EE, from among various power control options.

After the power consumption is adjusted in 630 or 640, the method performs 610 again. For example, the transmitter performs 610 again. In such an example, the transmitter estimates a data rate again in 610 after the power consumption is reduced in 630. When it is determined in 620 that the current data rate does not reach the required data rate due to the reduction of the power consumption, the transmitter increases the data rate by increasing the power consumption, in 640.

Figure 7:
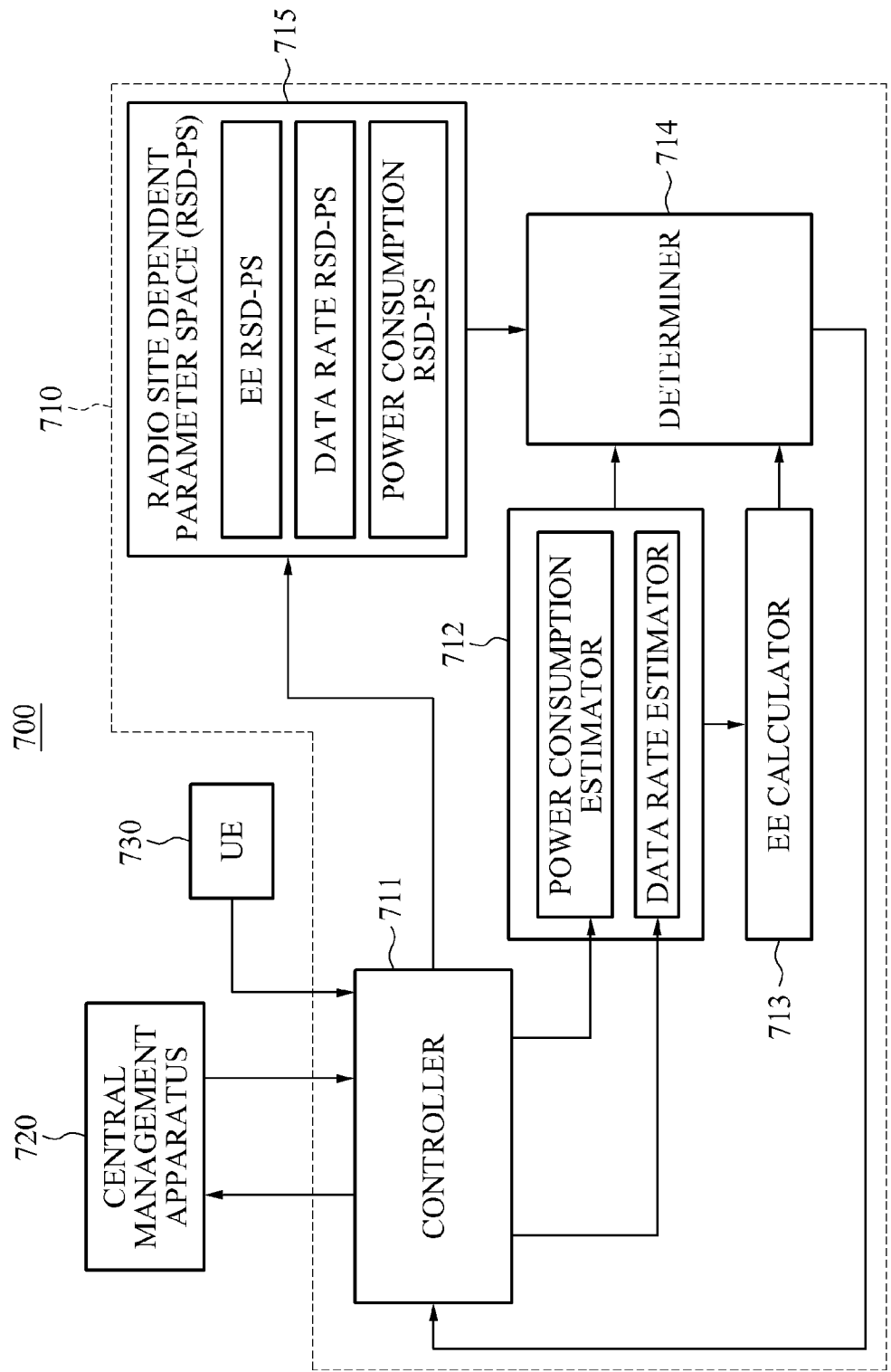
FIG. 7 is a diagram illustrating an example of a transmitter configured to increase an EE using a parameter space and a central management apparatus configured to manage a plurality of transmitters.

FIG. 7 illustrates an example of a transmitter configured to increase an EE using a parameter space and a central management apparatus configured to manage a plurality of transmitters.

Referring to FIG. 7, a communication system 700 includes a transmitter 710, a central management apparatus 720, and a user terminal 730, for example, user equipment (UE). Although not shown in FIG. 7, the communication system 700 optionally includes other transmitters and user terminals.

In the example of FIG. 7, the central management apparatus 720 manages a plurality of transmitters. The central management apparatus 720 manages transmitters included in the communication system 700 from the perspective of the entire system. For example, the central management apparatus 720 manages a power consumption and a data rate of each transmitter. To do so, the central management apparatus 720 transmits an operational parameter of each transmitter to each transmitter, and each transmitter controls its power consumption based on the operational parameter.

For examples, the central management apparatus 720 considers a criterion related to a power consumption allowable for the transmitter 710 from the perspective of the entire system. Hereinafter, such a criterion is referred to as an allowable power consumption. The central management apparatus 720 generates the allowable power consumption based on various categories of information. In an example, the central management apparatus 720 generates different allowable power consumptions based on a time slot, a region, and a situation pertaining to the transmitter 710. After generating the allowable power consumption, the central management apparatus 720 transmits the allowable power consumption to the transmitter 710.

In the example of FIG. 7, a controller 711 included in the transmitter 710 receives channel quality information fed back from the user terminal 730 associated with the transmitter 710. Although not shown in FIG. 7, the transmitter 710 optionally further includes a receiving unit configured for providing a feedback of channel information. The controller 711 potentially receives feedback information received through the receiving unit.

The controller 711 generates information to be used for estimation of a data rate based on the feedback information. The controller 711 monitors each component using a power in the transmitter 710, and generates information to be used for estimation of a power consumption. Although not shown in FIG. 7, the transmitter 710 optionally further includes a monitoring unit configured to monitor a power consumption of each component. The controller 711 potentially generates the information to be used for the estimation of the power consumption based on an output signal of the monitoring unit. The controller 711 also parameterizes the information to be used for the estimation of the data rate and the information to be used for the estimation of the power consumption in a suitable form to be provided to an estimator 712.

The controller 711 provides the generated information to the estimator 712. The estimator 712 estimates a data rate and a power consumption of the transmitter 710 based on the provided information. To perform the estimation, the estimator 712 includes a power consumption estimator and a data rate estimator. Hence, these two component parts of the estimator 712 estimate power consumption and data rate, respectively, so as to provide information for an EE calculation.

Figure 8:
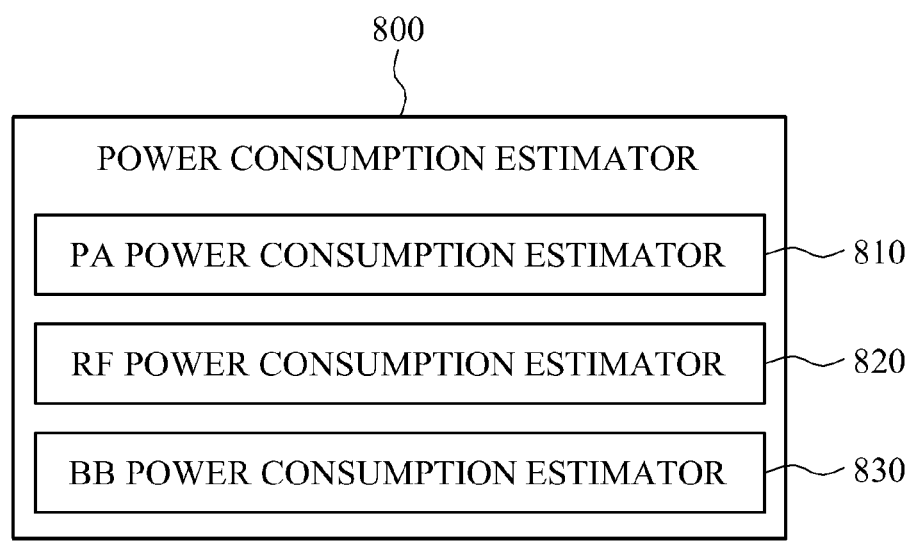
FIG. 8 is a block diagram illustrating an example of a power consumption estimator.

In this example, the power consumption estimator estimates a power consumption of each component using a power in the transmitter 710. For example, referring to FIG. 8, a power consumption estimator 800 includes a PA power consumption estimator 810, an RF power consumption estimator 820, and a BB power consumption estimator 830. The PA power consumption estimator 810 estimates a power consumption of a PA component, the RF power consumption estimator 820 estimates a power consumption of an RF chain component, and the BB power consumption estimator 830 estimates a power consumption of a BB component. By estimating the power consumption of each of the components and finding the sum, the power consumption estimation 800 calculates the total power consumption.

The estimator 712 provides the estimated data rate and the estimated power consumption to an EE calculator 713. The EE calculator 713 calculates an EE of the transmitter 710 based on the estimated data rate and the estimated power consumption provided by the estimator 712. As described above, the EE of the transmitter 710 is modeled, for example, to be measured in a unit of bps/W.

In this example, a determiner 714 determines a performance level of the EE (bps/W) to be maintained, based on the estimated power consumption and the estimated data rate. For example, the determiner 714 reduces an operational complexity to increase the EE using a parameter space 715, for example, a radio site dependent parameter space (RSD-PS).

The parameter space 715 includes information on a performance level of the transmitter 710 with respect to a parameter for an operation of the transmitter 710. In an example, the parameter space 715 includes a lookup table including a matrix of parameters and performance. The parameters include, for example, a number of transmitting antennas included in the transmitter 710, a precoding scheme used by a BB component, a resolution of an RF chain component, and a power reduction factor of a PA component. These parameters, when adjusted, help manage the power requirements of individual components of the transmitter 710. The performance may include an EE, a data rate of the transmitter 710, and a power consumption of the transmitter 710.

The determiner 714 adjusts at least one adjustable parameter using the parameter space 715 to achieve a required performance of the transmitter 710. As noted above, various approaches are used to measure performance. For example, the parameter space 715 acts as a guide to a determination of the determiner 714.

When a power that is lower than the allowable power consumption received from the central management apparatus 720 is used, the EE increases because EE is inversely related to allowable power consumption. In an example, the determiner 714 determines an operation point of each component with a low operational complexity, using the parameter space 715. Such an operation point corresponds to a power of at least one of the BB component, the RF chain component, and the PA component. The determiner 714 provides the determined operation point to the controller 711. Examples of the parameter space 715 used by the determiner 714 are described further with reference to FIGS. 12 through 16.

A mobile communication environment has the potential to change continually. To address changes in the mobile communication environment, the determiner 714 updates the operation point of each component iteratively at predetermined intervals. The update intervals of the operation point are set based on a system design. In an example, various heuristics and algorithms determine the update interval, though other ways of setting the update intervals are used in other examples.

Figure 9:
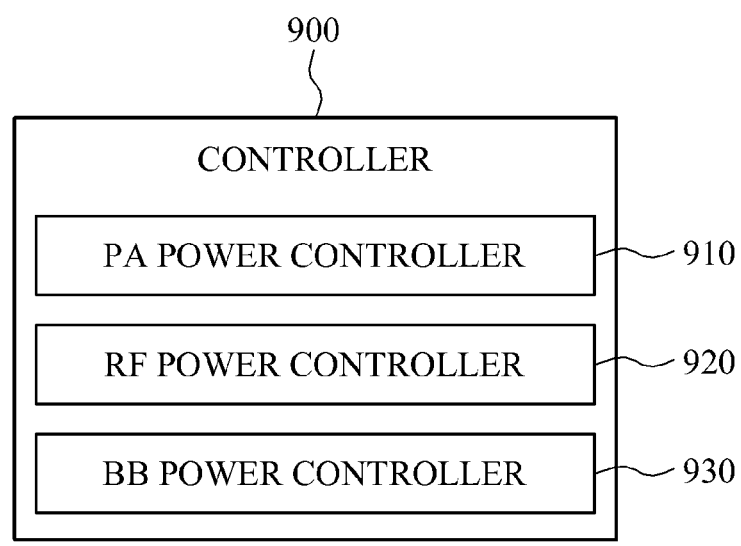
FIG. 9 is a block diagram illustrating an example of a controller.

The controller 711 controls a power of each component based on the determined operation point. For example, referring to FIG. 9, a controller 900 includes a PA power controller 910, an RF power controller 920, and a BB power controller 930. Accordingly, the PA power controller 910 controls a power of the PA component, the RF power controller 920 controls a power of the RF chain component, and the BB power controller 930 controls a power of the BB component.

In another example, the determiner 714 updates the parameter space 715. As part of the updating, the determiner 714 determines, for example, whether information stored in the parameter space 715 is unavailable, based on a current power consumption, a current data rate, and a current EE. The determiner 714 adjusts an operation point of at least one component. The controller 711 then performs a power control corresponding to the adjusted operation point, so that the result provided by the determiner 714 affects actual power consumption. The determiner 714 receives a power consumption, a data rate, and an EE updated by the adjusted operation point, thereby taking into account the results of the adjustment. The determiner 714 updates the parameter space 715 based on information updated by adjusting the operation point.

In still another example, the determiner 714 accumulates updated information while performing the process of adjusting the operation point a number of times. The determiner 714 determines the operation point of each component based on the accumulated information. Hence, the determiner 714 employs an iterative method to update the settings for each component.

Figure 10:
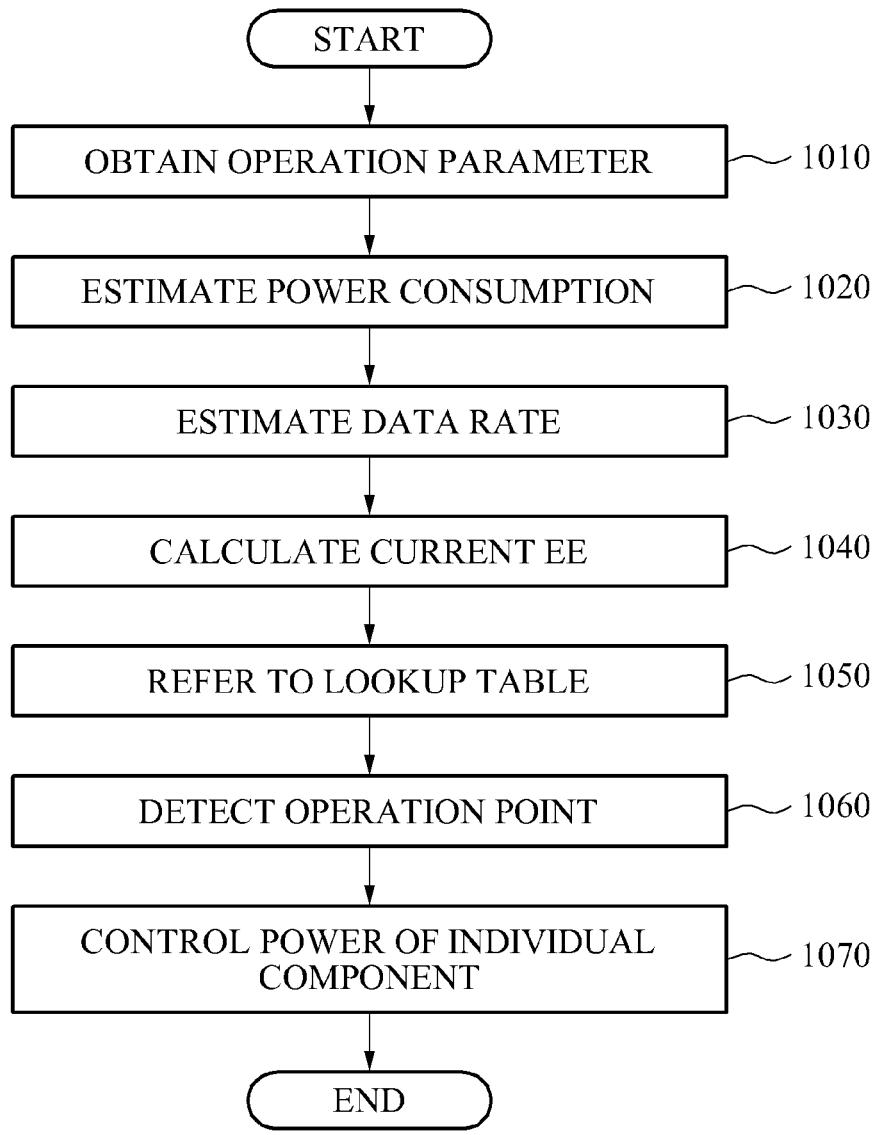
FIG. 10 is a flowchart illustrating an example of an operating method of a transmitter configured to increase an EE using an operation parameter and a lookup table.

FIG. 10 illustrates an example of an operating method of a transmitter configured to increase an EE using an operation parameter and a lookup table.

Referring to FIG. 10, in 1010 the method obtains an operation parameter. For example, the transmitter obtains an operation parameter, in 1010. In such an example, the transmitter receives the operation parameter from a central management apparatus. In 1020, the method estimates a power consumption. For example, the transmitter estimates a power consumption. In 1030, the method estimates a data rate. For example, the transmitter estimates a data rate. In 1040, the method calculates a current EE based on the estimated power consumption and the estimated data rate. For example, the transmitter calculates a current EE based on the estimated power consumption and the estimated data rate.

In 1050, the method refers to a lookup table. For example, the transmitter refers to a lookup table. In such an example, the lookup table refers to information stored in the parameter space 715 of FIG. 7. In 1060, the method detects an operation point For example, the transmitter detects an operation point. In 1070, the method controls a power of an individual component based on the operation point. For example, the transmitter controls a power of an individual component based on the operation point.

The descriptions provided with reference to FIGS. 1 through 9 are applicable to each operation illustrated in FIG. 10. Thus, duplicated descriptions are omitted here for conciseness, as the operations in FIG. 10 have already been described, above.

Figure 11:
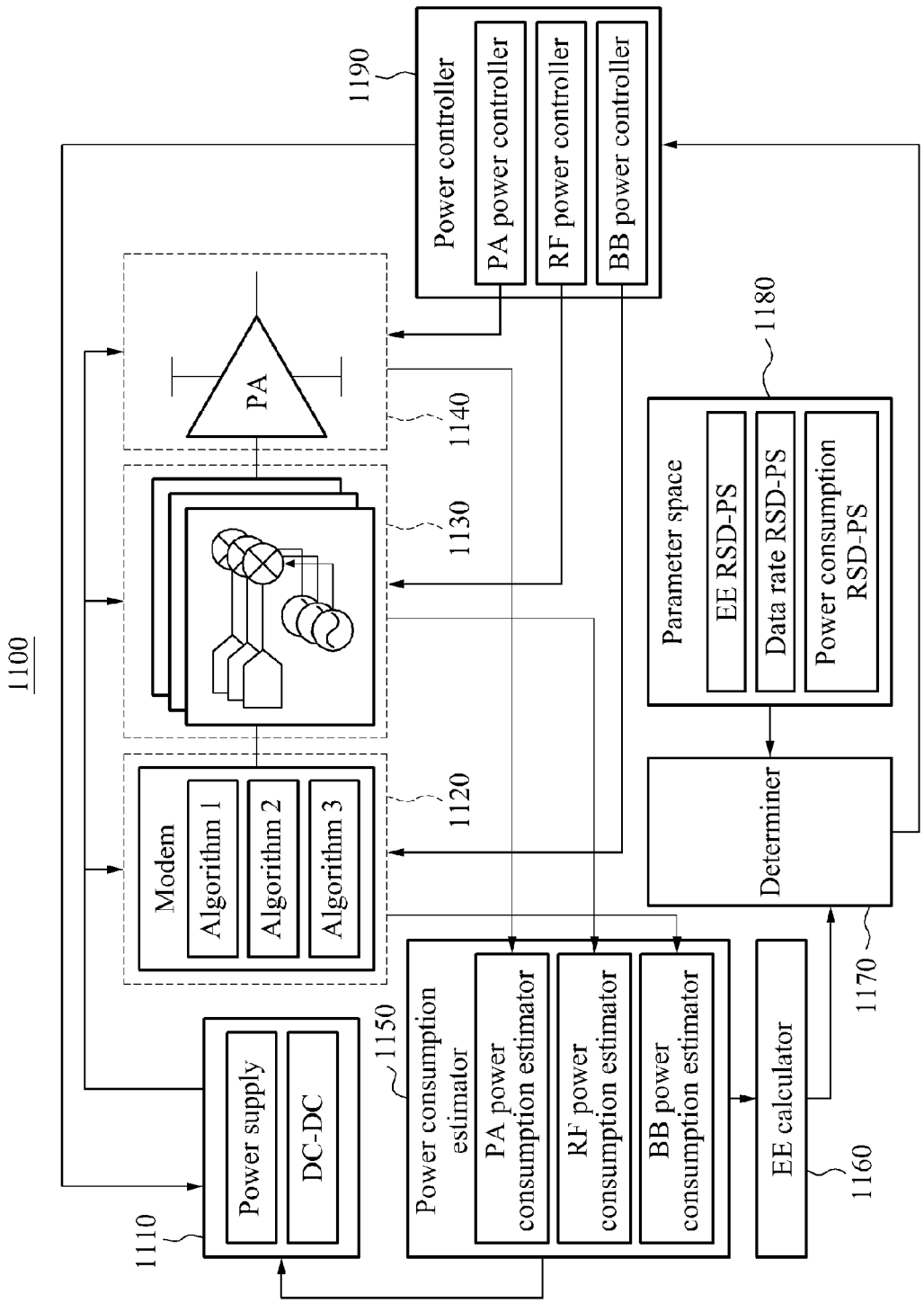
FIG. 11 is a block diagram illustrating an example of a transmitter configured to increase an EE by controlling powers of individual components.

FIG. 11 illustrates an example of a transmitter 1100 configured to increase an EE by controlling power of individual components of the transmitter 1100.

Referring to FIG. 11, the transmitter 1110 includes a power supply 1110, a BB component 1120, an RF chain component 1130, a PA component 1140, a power consumption estimator 1150, an EE calculator 1160, a determiner 1170, a parameter space 1180, and a power controller 1190. The descriptions provided with reference to FIGS. 1 through 10 may be applied to each module illustrated in FIG. 11 and thus, duplicated descriptions will be omitted here for conciseness, as the operations performed by components in FIG. 11 have already been described, above.

The BB component 1120 includes a modem. Such a modem modulates and demodulates analog signals for digital transmission. The RF chain component 1130 includes an RF chain. The PA component 1140 includes a PA. In an example, the transmitter 1110 controls power of the modem, the RF chain, and the PA, individually. By controlling the power of these components individually, the transmitter 1110 is able to allocate power to increase performance.

For example, the modem potentially has the flexibility to employ various algorithms. Thus, the modem may have various power modes corresponding to different algorithms, and an algorithm that increases the EE is selected depending on a particular situation.

In a transmission system, a great portion of a power is often used by a PA. Accordingly, by controlling a power consumption of the PA, the EE may be increased. However, when a large number of transmitting antennas are included in the system, a more significant portion of the power is used by an RF chain.

For example, when hundreds of transmitting antennas are included in the system, energy is concentrated on a desired area through beamforming techniques to reduce a radiation power. However, an amount of the power used by the RF chain increases in proportion to the number of the transmitting antennas. Accordingly, in a case of a system including an excessive number of transmitting antennas, a power consumption of an RF chain is of particular significance when managing overall power consumption.

To control the power of the RF chain, multiple RF chains correspond to a single transmitting antenna. In this example, the single transmitting antenna physically corresponds to an RF chain component including many RF chains. Thus, the single transmitting antenna is connected to multiple RF chains in terms of logic or functions. Accordingly, the power of the RF chain is controlled to increase the EE while satisfying specifications corresponding to a situation, such as a transmission rate corresponding to the situation.

Figure 12:
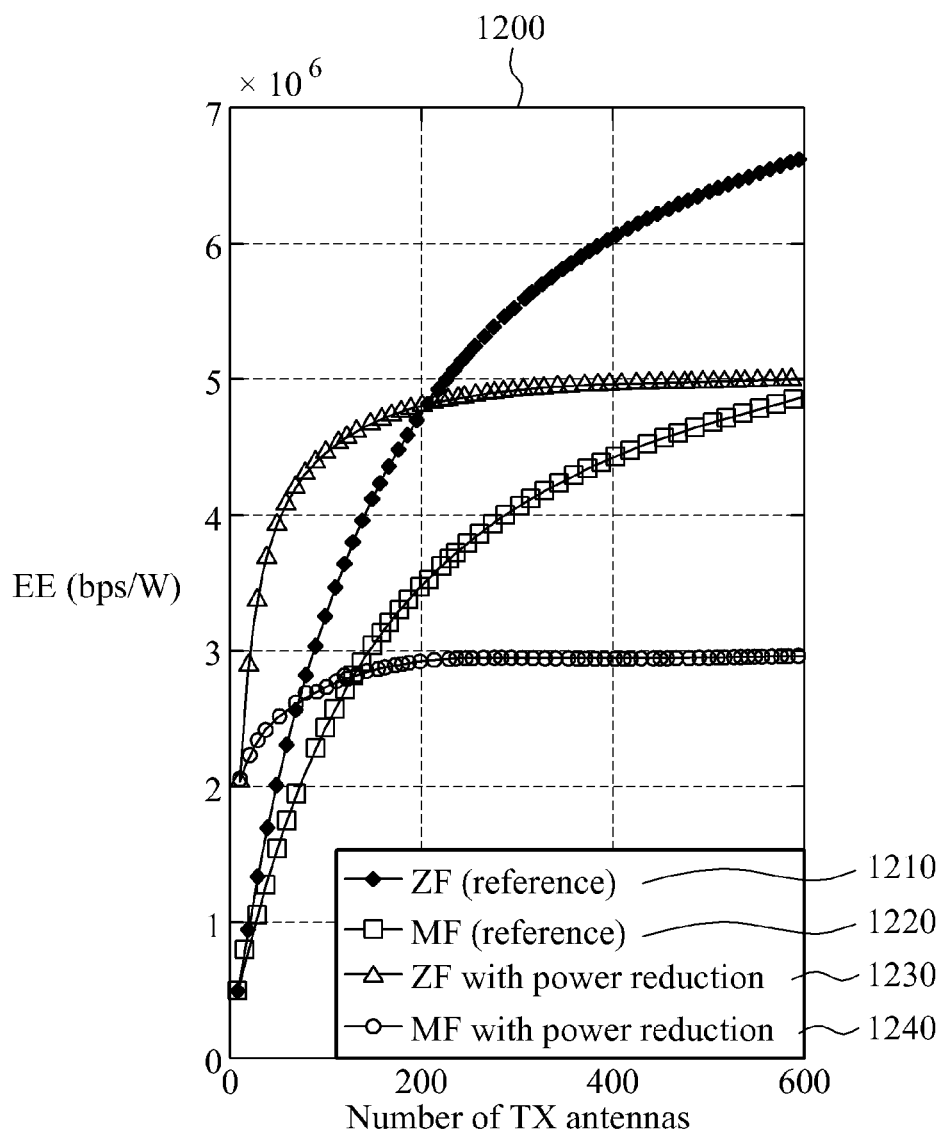
FIG. 12 is a graph illustrating an example of a change in an EE when a number of transmitting antennas is used as a parameter.

FIG. 12 illustrates an example of a change in an EE when a number of transmitting antennas is used as a parameter.

Referring to FIG. 12, the EE varies as the number of transmitting antennas is changed. In a graph 1200, an x axis denotes the number of transmitting antennas, and a y axis denotes the EE. In FIG. 12, the EE is measured in a unit of bps/W. The graph 1200 shows results of a simulation performed under conditions that an RF chain component uses a power of 1 W, a number of users in the simulation corresponds to 1/10 of the number of transmitting antennas, and a very large scale integration (VLSI) efficiency corresponds to 50 billion floating point operations per second per watt (Gflops/W).

A curve 1210 shows an aspect of the EE of the transmitter changing with respect to a change in the number of transmitting antennas when a zero-forcing (ZF) precoding scheme is used by a BB component. A curve 1220 shows an aspect of the EE of the transmitter changing with respect to a change in the number of transmitting antennas when a matched filtering (MF) precoding scheme is used by the BB component.

A curve 1230 shows an aspect of the EE of the transmitter changing with respect to a change in the number of transmitting antennas when a ZF precoding scheme is used by the BB component and a power of a PA component is reduced by the number of users divided by the number of transmitting antennas. A curve 1240 shows an aspect of the EE of the transmitter changing with respect to a change in the number of transmitting antennas when an MF precoding scheme is used by the BB component and the power of the PA component is reduced by the number of users divided by the number of transmitting antennas.

The EE of the transmitter changes, for example, based on the number of transmitting antennas, a type of the precoding scheme used by the BB component, and the power of the PA component. In the example of graph 1200, parameters correspond to the number of transmitting antennas, the type of the precoding scheme used by the BB component, and the power of the PA component.

In an example, the transmitter determines values of the parameters to achieve a desired EE. For example, to obtain a maximum EE of the transmitter, a set of particular values of the parameters are derived, namely a set of the number of transmitting antennas, a precoding scheme, and a power reduction activation or deactivation of the PA component. For example, the set may be determined to be 600, a ZF precoding scheme, and a deactivation, respectively for one particular situation. However, as discussed above, by varying the parameters in the set, it is possible to maximize EE while meeting performance constraints.

In another example, when restrictive conditions are present with respect to at least a portion of the parameters, the transmitter increases the EE by adjusting the remaining parameters. For example, in a particular situation, when the number of transmitting antennas is limited to 100, the transmitter determines a set of parameters for a precoding scheme and a power reduction activation or deactivation of the PA component to be a ZF precoding scheme and an activation, to obtain the maximum EE under the specified conditions. However, this is merely an example, and the determined parameters vary from situation to situation.

Figure 13:
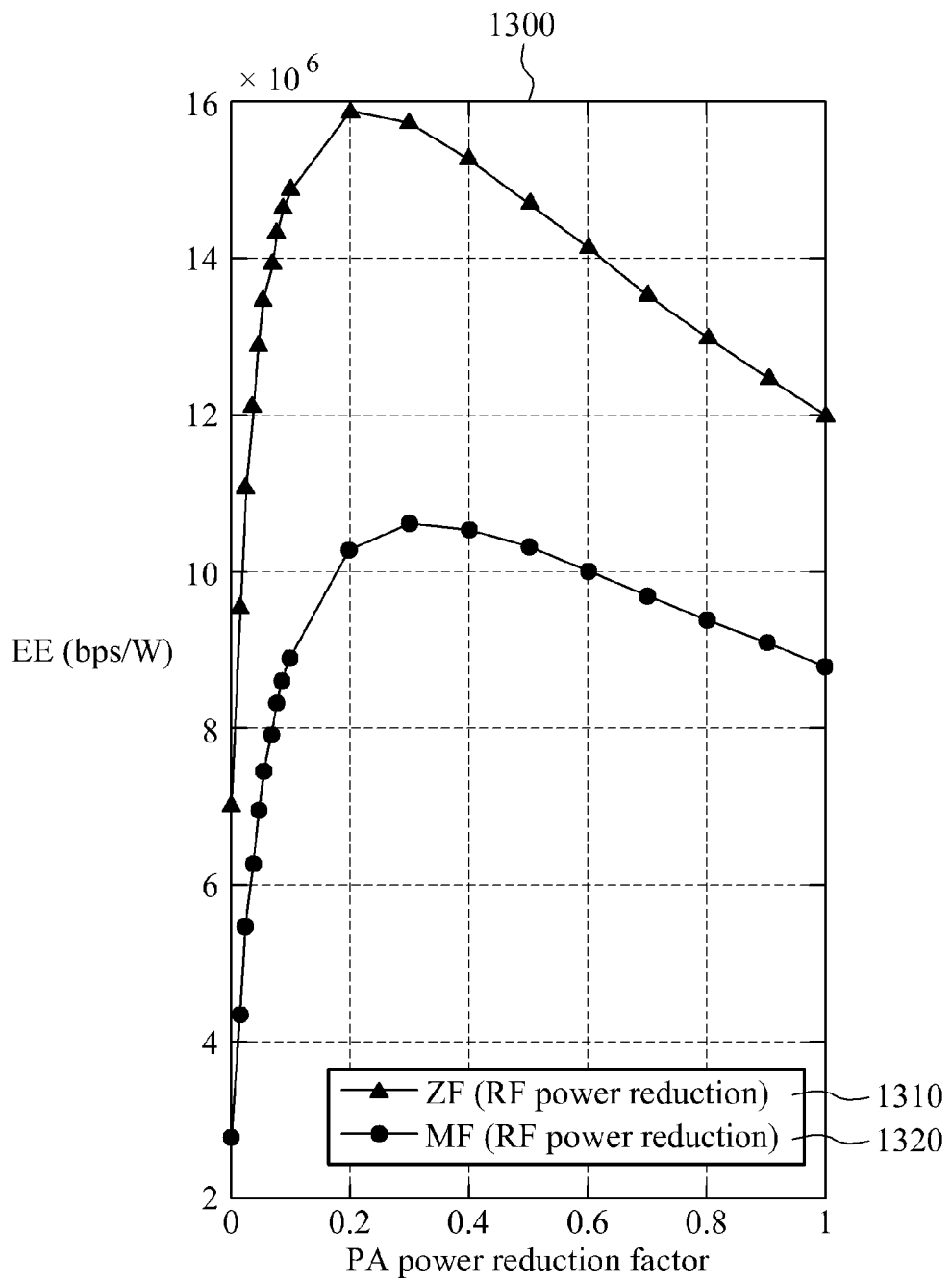
FIG. 13 is a graph illustrating an example of a change in an EE when a power reduction factor of a power amplifier (PA) component is used as a parameter.

FIG. 13 illustrates an example of a change in an EE when a power reduction factor of a PA component is used as a parameter.

Referring to FIG. 13, the EE varies as the power reduction factor of the PA component is changed. In a graph 1300, an x axis denotes the power reduction factor of the PA component, and a y axis denotes the EE. In the graph 1300, the power reduction factor is measured as a factor from 0 to 1. In the graph 1300, the EE is measured in a unit of bps/W. The graph 1300 shows a result of a simulation performed under conditions that a number of transmitting antennas corresponds to 400, a number of user terminals corresponds to 40, and a power consumption of an RF chain component per transmitting antenna corresponds to 0.3 W.

A curve 1310 shows an aspect of the EE of a transmitter changed based on the power reduction factor of the PA component when a ZF precoding scheme is used by a BB component. A curve 1320 shows an aspect of the EE of the transmitter changed based on the power reduction factor of the PA component when an MF precoding scheme is used by the BB component.

Both of the curves 1310 and 1320 have optimal points at which the EE is maximized That is, both of the curves 1310 and 1320 have maximum values at certain power reduction factors at which the EE assumes a values that cannot be increased further by changing the PA power reduction factor. For example, the transmitter determines the optimal points to be operation points. In examples in which an allowable power consumption or a required data rate is constrained, the transmitter determines an operation point at which an optimized EE is achieved under the given constraints.

Figure 14:
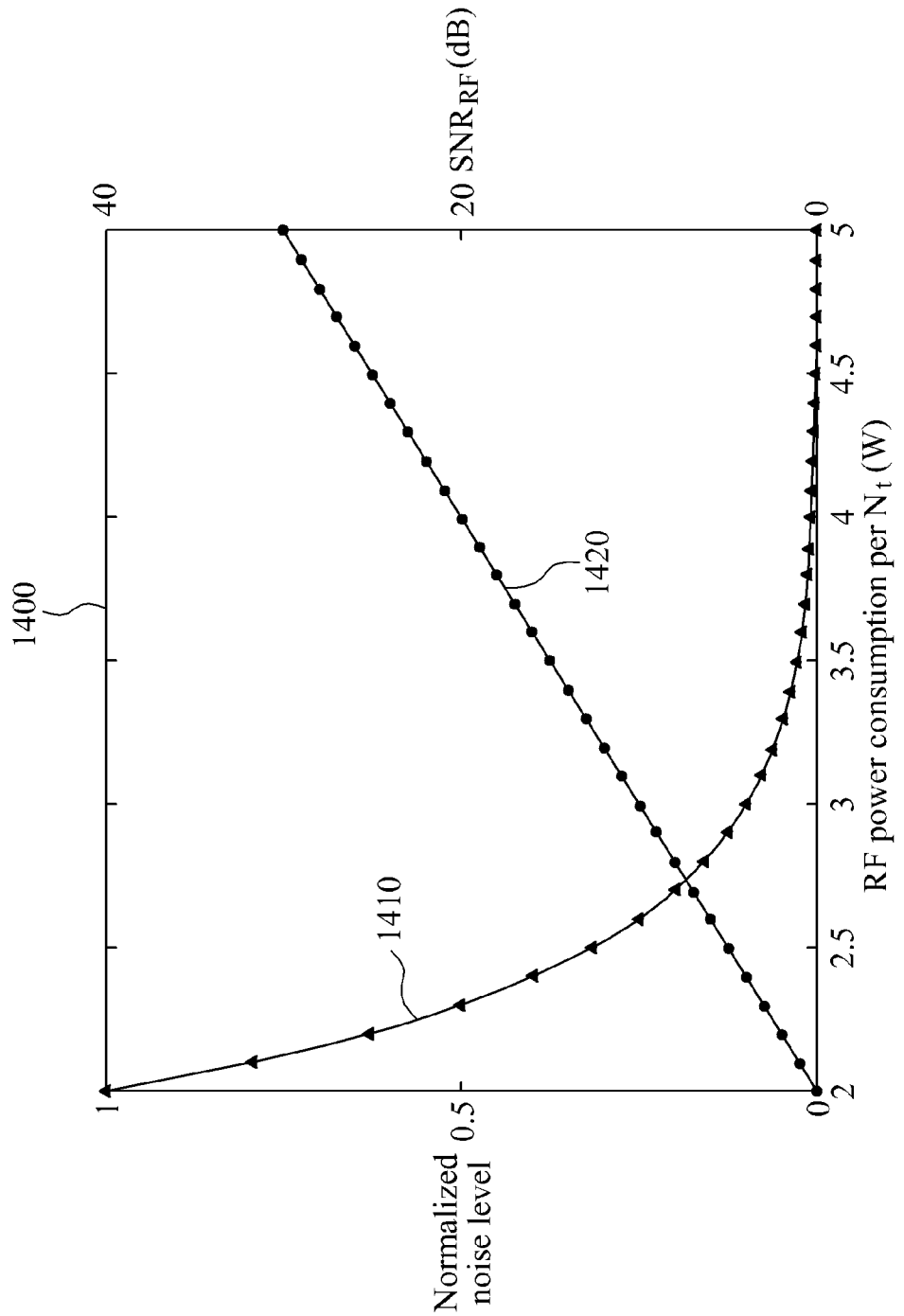
FIG. 14 is a graph illustrating an example of a signal-to-noise ratio (SNR) and a normalized noise level changed based on a power consumption, of an RF chain component, per transmitting antenna.

FIG. 14 illustrates an example of a signal-to-noise ratio (SNR) and a normalized noise level changing based on a power consumption, of an RF chain component, per transmitting antenna.

Referring to FIG. 14, a graph 1400 shows a result of modeling a performance of a transmitter changed, based on the power consumption of the RF chain component, to simulate a change in an EE based on a power consumption of the RF chain component. In this instance, the power consumption of the RF chain component per antenna may be reduced from 5 W to 2 W. In this example, it is assumed that as the power consumption increases, a delay in the noise level experiences an exponential increase. A curve 1410 shows an aspect of the normalized noise level performance changing based on the power control of the RF chain component. A curve 1420 shows an aspect of the SNR changing based on the power control of the RF chain component.

Figure 15:
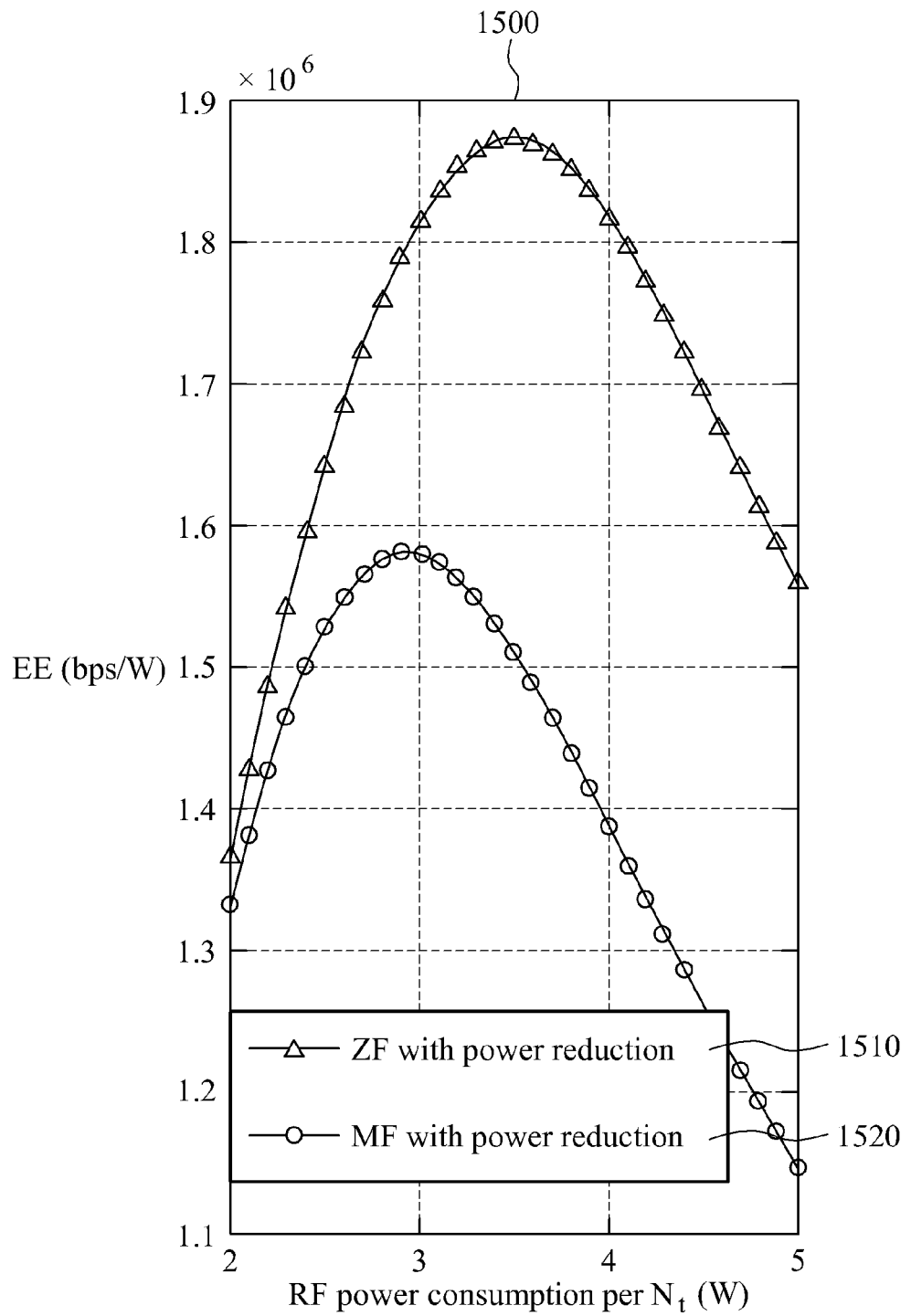
FIG. 15 is a graph illustrating an example of a change in an EE when a power consumption of an RF chain component is used as a parameter.

FIG. 15 illustrates an example of a change in EE when a power consumption of an RF chain component is used as a parameter.

Referring to FIG. 15, the EE varies as the power consumption of the RF chain component changes. In a graph 1500, an x axis denotes the power consumption of the RF chain component, and a y axis denotes the EE. In this example, the EE is measured in a unit of bps/W. The graph 1500 shows a result of a simulation performed based on the model of FIG. 14.

A curve 1510 shows an aspect of the EE of a transmitter changing based on the power consumption of the RF chain component when a ZF precoding scheme is used by a BB component. A curve 1520 shows an aspect of the EE of the transmitter changing based on the power consumption of the RF chain component when an MF precoding scheme is used by the BB component.

The curves 1510 and 1520 both have optimal points at which the EE is maximized. These optimal points are analogous to the maxima for curves 1310 and 1320. In a similar manner, the transmitter determines the optimal points to be operation points. When an allowable power consumption or a required data rate is constrained, the transmitter determine an operation point at which an optimized EE is achieved under the given constraints.

Figure 16:
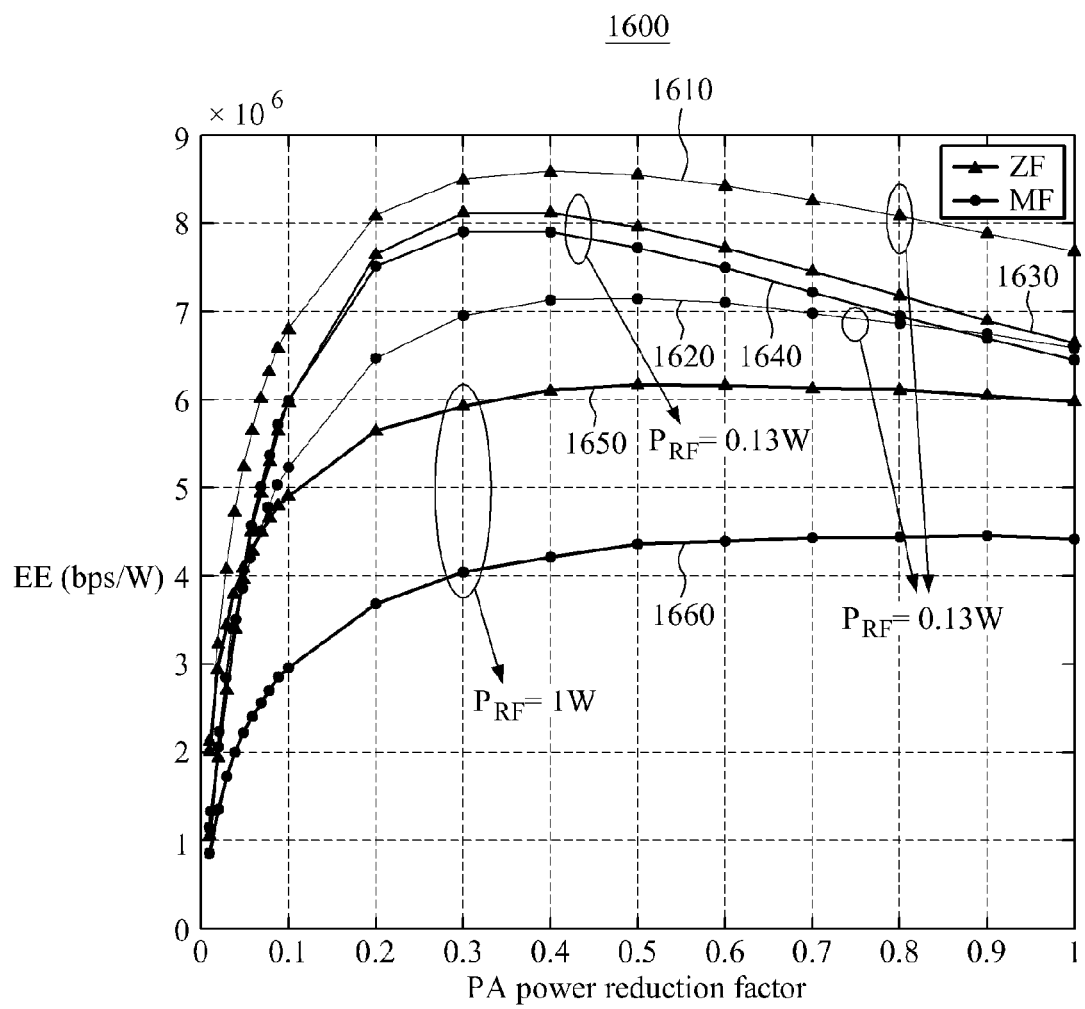
FIG. 16 is a graph illustrating an example of a change in an EE when a power reduction factor of a PA component and a power consumption of an RF chain component are used as parameters.

FIG. 16 illustrates an example of a changes in an EE when a power reduction factor of a PA component and a power consumption of an RF chain component are used as parameters.

Referring to FIG. 16, the EE varies as the power reduction factor of the PA component changes. In a graph 1600, an x axis denotes the power reduction factor of the PA component, and a y axis denotes the EE. In the graph 1600, the EE is measured in a unit of bps/W. In the graph 1600, the power reduction factor is measured as a factor from 0 to 1.

A curve 1610 shows an aspect of the EE of a transmitter changing based on the power reduction factor of the PA component when a ZF precoding scheme is used by a BB component and a power of 0.43 W is used by the RF chain component. A curve 1620 shows an aspect of the EE of the transmitter changing based on the power reduction factor of the PA component when an MF precoding scheme is used by the BB component and a power of 0.43 W is used by the RF chain component.

A curve 1630 shows an aspect of the EE of a transmitter changing based on the power reduction factor of the PA component when a ZF precoding scheme is used by the BB component and a power of 0.13 W is used by the RF chain component. A curve 1640 shows an aspect of the EE of the transmitter changing based on the power reduction factor of the PA component when an MF precoding scheme is used by the BB component and a power of 0.13 W is used by the RF chain component.

A curve 1650 shows an aspect of the EE of a transmitter changing based on the power reduction factor of the PA component when a ZF precoding scheme is used by the BB component and a power of 1 W is used by the RF chain component. A curve 1660 shows an aspect of the EE of the transmitter changing based on the power reduction factor of the PA component when an MF precoding scheme is used by the BB component and a power of 1 W is used by the RF chain component.

The curves 1610, 1620, 1630, 1640, 1650, and 1660 all have optimal points at which the EE is maximized for the constraints and parameters associated with the curves. In such examples, the transmitter determines the optimal points to be operation points. When an allowable power consumption or a required data rate is constrained, the transmitter determine an operation point at which an optimized EE is derived under the given constraints.

Hereinafter, a system modeling technique used to aid in the analysis performed above is described further. As described above, the EE of the transmitter is modeled, in examples, to be measured in a unit of bps/W. Accordingly, modeling of a channel capacity corresponding to bps and modeling of a power consumption corresponding to W is described further.

A. Channel Capacity

In an example MIMO communication system, the transmitter includes $N_t$ antennas and K receivers are provided. Each receiver may include a single antenna. In an example, the transmitter is a base station, and the receivers are user terminals. However, in other MIMO communication systems, examples include different transmitters and receivers.

A reception signal y received by each receiver from the transmitter may be determined as expressed by Equation 1.

$$y = \sqrt{P_{tx}} Hs + n \qquad \text{Equation 1}$$

In Equation 1, y denotes a reception signal vector of K×1 size, $P_{tx}$ denotes a total transmission power, and H denotes a Rayleigh channel matrix of $N_t$×K size. s denotes a transmission signal vector of $N_t$×1 size, and n denotes an additive white Gaussian noise (AWGN) vector having a size of K×1.

In the MIMO communication system that includes the plurality of receivers, the transmitter performs precoding through a precoding unit to reduce interference among the receivers. For example, such precoding is divided into linear precoding and non-linear precoding. In general, non-linear precoding has better performance than linear precoding, but non-linear precoding has higher complexity than linear precoding.

Hereinafter, examples consider a case in which linear precoding is adopted under conditions that the number $N_t$ of the antennas of the transmitter is sufficiently large. In particular, in the MIMO communication system including the $N_t$ antennas of the transmitter, an optimized performance is achieved using linear precoding if $N_t$ is sufficiently large.

Linear precoding may include MF precoding, ZF precoding, and regularized zero-forcing (RZF) precoding, as listed in Table 2. In an example, MF precoding and ZF precoding may be used.

TABLE 2

| | MF | ZF | RZF |
|---|---|---|---|
| F | $N_t^{-1} H^H$ | $H^H (HH^H)^{-1}$ | $H^H (HH^H + \nu I_K)^{-1}$ |

When the transmitter performs precoding, the transmission signal vector s is expressed by Equation 2.

$$S = \zeta F x \qquad \text{Equation 2}$$

In Equation 2, $\zeta$ denotes a normalized factor of a transmission power, and F denotes an $N_t$×K precoding matrix. The precoding matrix F is chosen appropriately from Table 2. Applying Equation 2 to Equation 1, the reception signal vector y is revised as expressed by Equation 3.

$$y = \sqrt{P_{tx}} H \zeta F x + n \qquad \text{Equation 3}$$

In Equation 3, since $\|\zeta F x\|^2 = 1$ is to be satisfied, $\zeta$ is expressed by Equation 4, which provides a way to approximate $\zeta$.

$$\zeta \approx \sqrt{\frac{N_t}{K}} \qquad \text{Equation 4}$$

In this example, a reception signal of a $k^{th}$ receiver, among the plurality of receivers, is defined as expressed by Equation 5.

$$y_k = \sqrt{\frac{P_{tx} N_t}{K}} h_{k,:} f_{:,k} x_k + n_k + \sqrt{\frac{P_{tx} N_t}{K}} \sum_{l \neq k} h_{k,:} f_{:,l} x_l \qquad \text{Equation 5}$$

In Equation 5, $h_k$ denotes a 1×$N_t$ channel vector of the $k^{th}$ receiver, $f_{:,k} x_k$ denotes an $N_t$×1 precoding vector of the $k^{th}$ receiver. $n_k$ denotes noise of the $k^{th}$ receiver.

The channel capacity refers to a maximum amount of information to be transmitted through a channel. For example, the channel capacity is expressed as a maximum data rate. In a case of a single independent cell, the channel capacity is defined as expressed by Equation 6.

$$C = \alpha B \cdot \sum_{k=1}^{K} E\left[\log_2\left(1 + \frac{\frac{P_{tx}N_t}{K}|h_{k,:}f_{:,k}|^2}{\frac{P_{tx}N_t}{K}\left|\sum_{l\neq k} h_{k,:}f_{:,l}\right|^2 + N_0 B}\right)\right] \quad \text{Equation 6}$$

In Equation 6, C denotes the channel capacity, and a denotes a scaling factor based on a pilot overhead and an orthogonal frequency division multiplexing (OFDM) guard band. $N_0 B$ denotes a noise power in a given bandwidth B.

As described above, when the number of the antennas of the transmitter is sufficiently greater than the number of antennas of the receiver, for example, when $N_t > 10K$, Equation 6 may be briefly defined and approximated as expressed by Equation 7.

$$C_{approx}^{LS\text{-}MIMO} \approx \alpha BK \cdot \left[\log_2\left(1 + \frac{P_{tx}N_t}{(I+N_0 B)K}\right)\right] \quad \text{Equation 7}$$

In Equation 7, I denotes interference among the receivers. In an example, the interference among the receivers is eliminated or reduced through precoding.

B. Power Consumption

The method suggested herein relates to a method of maximizing an EE in a MIMO communication system. Accordingly, the EE of the transmitter is to be derived. The EE may be defined through a sum power model, as expressed by Equation 8.

$$P_{sum} = P_{PA} + P_{BB} + N_t P_{RF_{front}} \quad \text{Equation 8}$$

In Equation 8, $P_{sum}$ denotes a sum power consumption of the transmitter, and $P_{PA}$ denotes a power consumption of a PA component included in the transmitter. $P_{BB}$ denotes a power consumption of a BB processor, and $P_{RF_{front}}$ denotes a power consumption of an RF front-end processor. $N_t$ denotes the number of antennas of the transmitter.

In an example, the RF front-end processor includes a mixer, a filter, and a DAC. Thus, in such an example, $P_{RF_{front}}$ is calculated based on power consumptions of the mixer, the filter, and the DAC.

To conduct a simple analysis of the EE, $P_c$ is defined as expressed by Equation 9.

$$P_c = (P_{BB}/N_t + P_{RF_{front}}) \quad \text{Equation 9}$$

Using Equation 9, Equation 8 is alternatively defined as expressed by Equation 10.

$$P_{sum} = P_{PA} + N_t P_c \quad \text{Equation 10}$$

A relationship between $P_{tx}$ and $P_{PA}$ is defined as expressed by Equation 11.

$$P_{tx} = \eta P_{PA} \quad \text{Equation 11}$$

In Equation 11, η denotes an efficiency of the PA component. For example, under conditions that a bandwidth corresponds to 10 megahertz (MHz), an OFDM system includes 1024 subcarriers, an input-backoff (IBO) corresponds to 11 decibels (dB), and a Class-B PA is provided, η may correspond to 22%.

C. EE

Using the power consumption and the channel capacity described above, the EE is defined as expressed by Equation 12.

$$EE = C/P_{sum} \quad \text{Equation 12}$$

In Equation 12, EE denotes the energy efficiency, C denotes the channel capacity, and $P_{sum}$ denotes the sum power consumption of the transmitter. For example, the channel capacity C is calculated using Equation 6 or 7, and the sum power consumption $P_{sum}$ is calculated using Equation 8 or 10.

In an example, an example technique to achieve an optimized EE performance under given conditions through EE metering using Equation 12 is provided. For example, by disposing a greater number of antennas in a transmission terminal than a number of users corresponding to reception terminals, energy may be concentrated on a desired area in a mobile communication multipath fading environment in which signals are transferred through various paths. Thus, efficient mobile communication is enabled using a relatively small amount of power. In order for the EE modeled using Equation 12 to be optimized, a power of at least one of a BB component, an RF chain component, and a PA component is controlled.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A transmitter comprising:
a baseband (BB) component;
a radio frequency (RF) chain component;
a power amplifier (PA) component; and
a controller configured to control a power consumption of at least one of the BB component, the RF chain component, and the PA component based on a calculation of an energy efficiency (EE) of the transmitter,
wherein a number of transmitting antennas included in the transmitter is greater than a number of terminals, provided in at least a predetermined ratio, associated with the transmitter.

2. The transmitter of claim 1, wherein the transmitter is configured to calculate the EE using a unit of bits per second per watt (bps/W).

3. The transmitter of claim 1, further comprising:
a calculator configured to calculate the EE based on a data rate and a power consumption of the transmitter.

4. The transmitter of claim 3, further comprising:
a data rate estimator configured to estimate the data rate based on channel information between the transmitter and terminals associated with the transmitter.

5. The transmitter of claim 3, further comprising:
a monitoring unit configured to monitor a power consumption of the BB component, a power consumption of the RF chain component, and a power consumption of the PA component; and
a power consumption estimator configured to estimate the overall power consumption based on the monitored power consumptions.

6. The transmitter of claim 1, wherein the controller is configured to control the power consumption of at least one of the BB component, the RF chain component, and the PA component so that total power consumption of the transmitter is less than or equal to an allowable power consumption.

7. The transmitter of claim 6, further comprising:
a receiving unit configured to receive the allowable power consumption from a central management apparatus configured to manage a plurality of transmitters.

8. The transmitter of claim 7, further comprising:
a transmitting unit configured to transmit a data rate and a power consumption of the transmitter to the central management apparatus.

9. A transmitter comprising:
a baseband (BB) component;
a radio frequency (RF) chain component;
a power amplifier (PA) component;
a controller configured to control a power consumption of at least one of the BB component, the RF chain component, and the PA component based on a calculation of an energy efficiency (EE) of the transmitter; and
a storage unit configured to store information on a performance of the transmitter based on a parameter,
wherein the controller is configured to determine, based on the stored information, an operation point at which the EE is maximized, and the operation point corresponds to the power consumption of at least one of the BB component, the RF chain component, and the PA component.

10. The transmitter of claim 9, wherein the parameter comprises at least one of a number of transmitting antennas included in the transmitter, a precoding scheme employed by the BB component, a resolution of the RF chain component, and a power reduction factor of the PA component.

11. The transmitter of claim 9, wherein the performance comprises at least one of the EE, a data rate of the transmitter, and a power consumption of the transmitter.

12. A transmitter comprising:
an obtainer configured to obtain a number of terminals associated with the transmitter;
a determiner configured to determine whether a number of transmitting antennas included in the transmitter is greater than the number of the terminals provided according to at least a predetermined ratio; and
a controller configured to control a power consumption of at least one of a baseband (BB) component, a radio frequency (RF) chain component, and a power amplifier (PA) component included in the transmitter based on a determination that the number of the transmitting antennas is greater than the number of the terminals provided according to at least the predetermined ratio.

13. The transmitter of claim 12, wherein the controller is configured to reduce the power consumption of at least one of the BB component, the RF chain component, and the PA component to maximize an energy efficiency (EE) of the transmitter while providing identical bandwidths to the terminals.

14. The transmitter of claim 12, wherein the controller is configured to reduce the power of at least one of the BB component, the RF chain component, and the PA component to maximize an EE of the transmitter while maintaining a data rate for communication with a previously assigned terminal.

15. The transmitter of claim 12, wherein the controller is configured to reduce a radiation power of the transmitter according to a ratio between the number of the terminals and the number of the transmitting antennas.

16. A method of controlling a power of a transmitter, comprising:
    obtaining a target energy efficiency (EE) of the transmitter; and
    controlling at least one of a power of a baseband (BB) component, a power of a radio frequency (RF) chain component, and a power of a power amplifier (PA) component to cause an EE of the transmitter to reach the target EE,
    wherein a number of transmitting antennas included in the transmitter is greater than a number of terminals, provided according to at least a predetermined ratio, associated with the transmitter.

17. The method of claim 16, further comprising:
    calculating a power consumption of the transmitter;
    calculating a data rate of the transmitter; and
    calculating the EE based on the power consumption and the data rate.

18. The method of claim 17, wherein the calculating of the power consumption comprises:
    monitoring a power consumption of the BB component;
    monitoring a power consumption of the RF chain component;
    monitoring a power consumption of the PA component; and
    estimating the power consumption of the transmitter based on the monitored power consumptions.

19. An energy efficiency (EE) calculator for calculating the EE of a transmitter, comprising:
    a data rate estimator configured to estimate a data rate of the transmitter;
    a power consumption estimator configured to estimate a power consumption of the transmitter; and
    an EE calculator configured to calculate the EE based on the power consumption and the data rate,
    wherein a number of transmitting antennas included in the transmitter is greater than a number of terminals, provided in at least a predetermined ratio, associated with the transmitter.

20. The energy efficiency calculator of claim 19, wherein the power consumption estimator comprises:
    a first monitoring unit configured to monitor a power consumption of a baseband (BB) component of the transmitter;
    a second monitoring unit configured to monitor a power consumption of the radio frequency (RF) chain component;
    a third monitoring unit configured to monitor a power consumption of the power amplifier (PA) component; and
    wherein the power consumption estimator is configured to estimate the power consumption of the transmitter based on the monitored power consumptions.

21. The energy efficiency calculator of claim 19, wherein the EE calculator is configured to calculate the EE using a unit of bits per second per watt (bps/W).

22. The energy efficiency calculator of claim 19, wherein the data rate estimator is configured to estimate the data rate based on channel information between the transmitter and terminals associated with the transmitter.

* * * * *